United States Patent [19]

Morozumi et al.

[11] Patent Number: 5,439,728

[45] Date of Patent: Aug. 8, 1995

[54] INK JET HEAD HAVING NOZZLE PLATE EMPLOYING SHEET ADHESIVE MATERIAL HAVING SMALL HOLES FOR USE IN INK JET PRINTERS

[75] Inventors: Masayuki Morozumi; Akira Takizawa, both of Nagano, Japan

[73] Assignee: Seiko Epson Corporation, Tokyo, Japan

[21] Appl. No.: 932,541

[22] Filed: Aug. 20, 1992

[30] Foreign Application Priority Data

Aug. 21, 1991 [JP] Japan .................. 3-209346
Aug. 21, 1991 [JP] Japan .................. 3-209347
Jul. 8, 1992 [JP] Japan .................. 4-206025

[51] Int. Cl.$^6$ .................. B41J 2/045; B32B 3/24
[52] U.S. Cl. .................. 428/136; 428/137; 428/131; 428/343; 428/344; 428/346; 428/138; 428/140; 428/195; 347/47; 347/68; 347/71
[58] Field of Search ............... 428/137, 131, 136, 343, 428/344, 346, 138, 140, 195; 347/47, 68, 71

[56] References Cited

U.S. PATENT DOCUMENTS

| | | | |
|---|---|---|---|
| 4,229,751 | 10/1980 | Tamai .................. | 346/140 R |
| 4,358,781 | 11/1982 | Yamamori et al. ........ | 346/140 R |
| 4,434,430 | 2/1984 | Koto .................. | 346/140 R |
| 4,516,140 | 5/1985 | Durkee et al. .......... | 346/140 R |
| 4,631,557 | 12/1986 | Cooke et al. ........... | 346/140 R |
| 4,680,595 | 7/1987 | Cruz-Uribe et al. ...... | 346/140 R |
| 4,695,854 | 9/1987 | Cruz-Uribe ............. | 346/140 R |
| 4,872,027 | 10/1989 | Buskirk et al. ......... | 346/140 R |
| 5,111,220 | 5/1992 | Hadimioglu et al. ...... | 346/140 R |
| 5,176,945 | 1/1993 | Brayton ................ | 428/131 |

FOREIGN PATENT DOCUMENTS 0357020 8/1989 European Pat. Off. .
3101958 4/1991 Japan .
4014458 1/1992 Japan .

OTHER PUBLICATIONS

IBM Technical Disclosure Bulletin, vol. 24, No. 11A, Apr. 1982, "Electroformed Print Head Array", D. G. Pittwood.
IBM Technical Disclosure Bulletin, vol. 19, No. 7, Dec. 1976, "NonCorrosive Bonding Technique for Silicon Nozzles in Ink Jet Printing", F. P. Giordano & R. Lane.
IBM Technical Disclosure Bulletin, vol. 24, No. 5, Oct. 1981, "Manufacturing Method for Ink Jet Jet Nozzles", J. W. Green.

*Primary Examiner*—William P. Watkins, III
*Attorney, Agent, or Firm*—Sughrue, Mion, Zinn, Macpeak & Seas

[57] ABSTRACT

An ink jet head wherein a sheet-shaped adhesive member, including ink escape holes and deformation preventive holes and spacers for preventing the ink escape holes from being deformed, is situated between a nozzle member and a chamber member, each having small holes corresponding in location to the ink escape holes of the sheet-shaped adhesive member. Having been bonded together by heating and pressurization, the three members form an integrated member for use in the print head of an ink jet printer.

5 Claims, 8 Drawing Sheets

5,439,728

INK JET HEAD HAVING NOZZLE PLATE EMPLOYING SHEET ADHESIVE MATERIAL HAVING SMALL HOLES FOR USE IN INK JET PRINTERS

FIELD OF THE INVENTION

The present invention relates to a sheet adhesive material for bonding two members having small holes to each other and method of bonding the two members. More particularly, the invention relates to a sheet-shaped adhesive member for bonding two plate-shaped members each having small holes, such as a nozzle plate employed in a recording head of an ink jet type recording apparatus.

RELATED ART

In a conventional ink jet type printer using an ink of a hot melt type as disclosed for example in an Unexamined Japanese Patent Application (OPI) No. Sho. 61-98547 or an ink jet type printer employing a print head of a superposed and contiguous type as disclosed in U.S. Pat. No. 4,680,595, a nozzle plate is fixed onto the front surface of a head base member in such a manner that a number of nozzle ports for ejecting ink formed in the nozzle plate are arranged respectively to correspond to a number of ink communication chambers each communicating with an ink tank.

However, in the conventional method an adhesive agent is simply applied to the contact surfaces of the two members to thereby bond the two members to each other, which may arise a problem that the adhesive agent penetrates and covers the nozzle holes to thereby cause the clogging of the nozzle holes and an undesired ink-failure.

SUMMARY OF THE INVENTION

The present invention was made in view of the foregoing drawbacks accompanying the conventional method as mentioned above. Accordingly, it is an object of the invention to provide a bonding method capable of bonding surely and fixedly two members to each other without causing the clogging of the nozzle holes or ink-failure condition.

It is another object of the invention to provide a sheet-shaped adhesive member capable of surely bonding two plate members each having small holes to form an integrated member without producing any clogging.

It is still another object of the invention to provide a sheet-shaped adhesive member capable of restricting the deformation of the sheet-shaped adhesive member in the thickness direction thereof to thereby further suppress an inward deformation of the escape holes.

The above and other objects can be achieved by a provision of a method for bonding together two members each having small holes which, according to the present invention, comprises a step of provisionally bonding by pressurizing onto a contact surface of one of the two members a sheet-shaped adhesive member having thereon escape holes each corresponding to the small holes of the member and deformation preventive holes for preventing the escape holes from being deformed, and a step of bonding by heating and pressurizing the other member onto the contact surface of the former member.

According to another aspect of the invention, a method of bonding together two members each having small holes comprises the steps of provisionally bonding by pressurizing onto a contact surface of one of the two members a sheet-shaped adhesive member having thereon escape holes corresponding in position to the respective small holes of the member, inserting a space forming member, and bonding by heating and pressurizing the other member onto the contact surface of the former member.

Furthermore, according to still another aspect of the invention, there is provided a sheet-shaped adhesive member having escape holes each corresponding in position to the respective small holes of the member and deformation preventive holes disposed adjacent to the escape holes capable of absorbing an extension of the sheet-shaped adhesive member in the surface direction thereof to thereby suppress an inward deformation of the escape holes.

DESCRIPTION OF THE PREFERRED EMBODIMENTS

Figure 1:
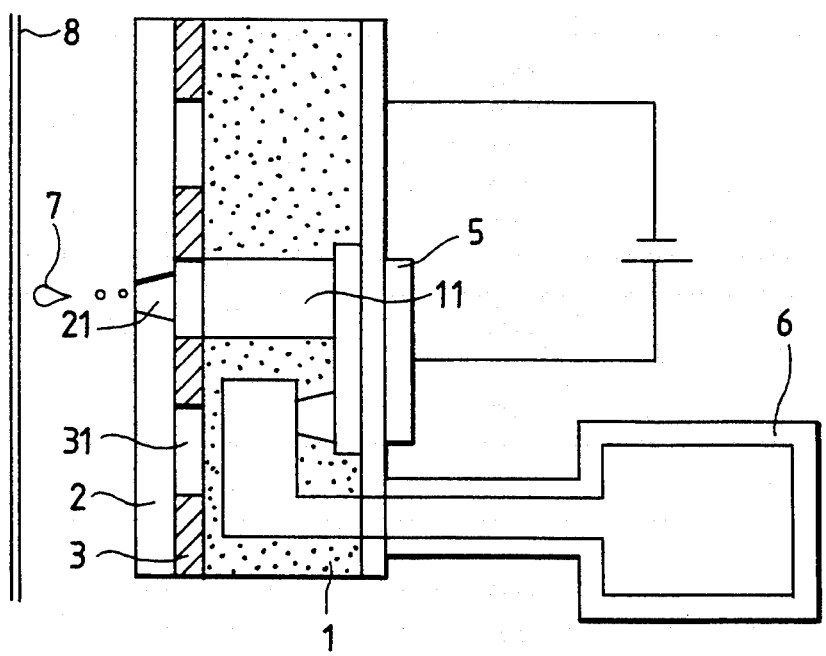
FIG. 1 is a view showing a structure of a print head in an ink jet type printer to which the present invention is applied.

FIG. 1 is a view showing a structure of a print head of an ink jet type printer to which the present invention is applied.

As shown in FIG. 1, a head base member 1 is provided with an ink communication chamber 11 communicating with an ink tank 6. The head base member 1 is formed of a high molecular resin material such as polysulfone, polyethersulfone, polycarbonate or the like. A nozzle plate 2 is provided with a nozzle hole 21 for ejecting an ink droplets 7 and is press-machined, which plate is formed of electroformed nickel, stainless steel, beryllium copper or the like. The head base member 1 and the nozzle plate 2 are strongly bonded to each other by means of an adhesive member 3 while keeping a communication between the ink communication chamber 11 and the nozzle hole 21. After manufacturing the recording head, the ink droplets 7 is ejected by driving a PZT 5 onto a recording sheet 8 to thereby achieve printing.

During bonding the above mentioned two members, if the adhesive member 3 penetrates into and covers the nozzle hole 21 of the nozzle plate 2 to cause the clogging, then the ink droplets 7 cannot be ejected out, which is a serious defect in a printer.

The sheet-shaped adhesive member and method of bonding together the head substrate 1 and nozzle plate 2 by the sheet-shaped adhesive member according to a first embodiment will now be described hereinbelow with reference to accompanied FIGS. 2 to 8.

Figure 2:
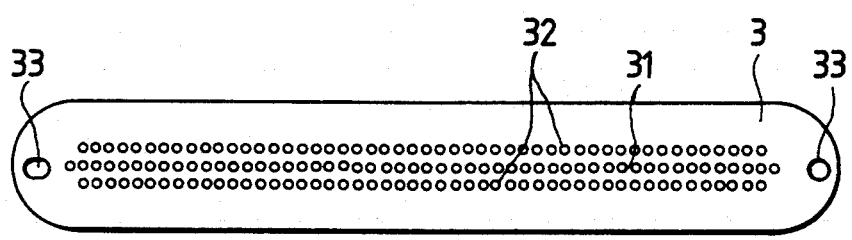
FIG. 2 is a plan view of a sheet-shaped adhesive member employed in an embodiment of a method of bonding together two members each having small holes according to the present invention.
Figure 3:
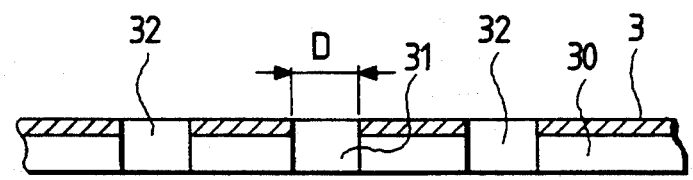
FIG. 3 is a side view of the sheet-shaped adhesive member shown in FIG. 2.
Figure 4:
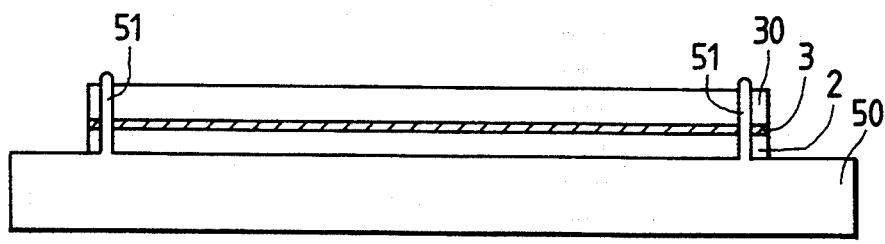
FIG. 4 is a side view of a positioning step employed in the embodiment of the invention.
Figure 5:
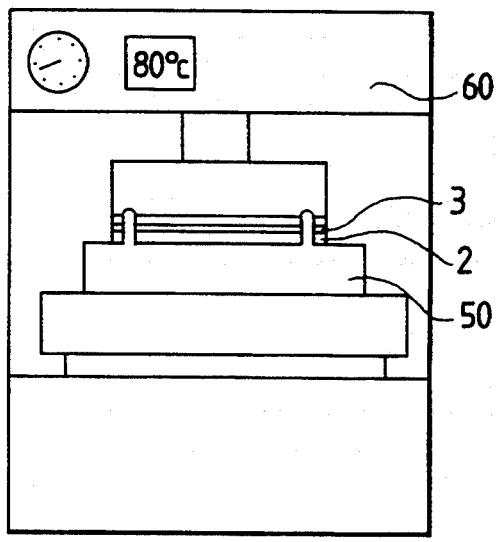
FIG. 5 is a view of a step of provisionally bonding the adhesive member employed in the embodiment of the invention.
Figure 6:
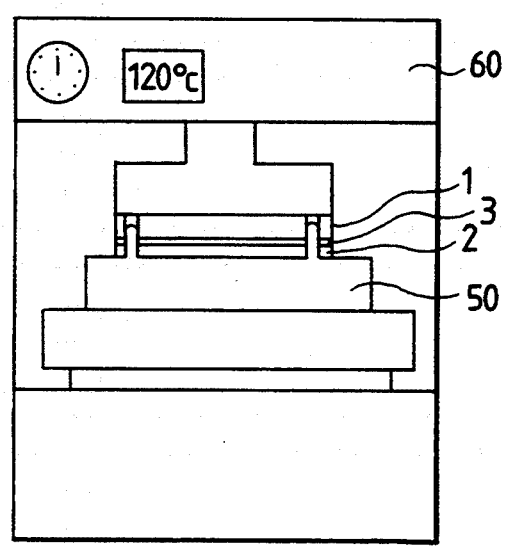
FIG. 6 is a view of a step of substantially bonding a head substrate, a nozzle plate and the above adhesive member to one another, which step is employed in the invention.
Figure 7:
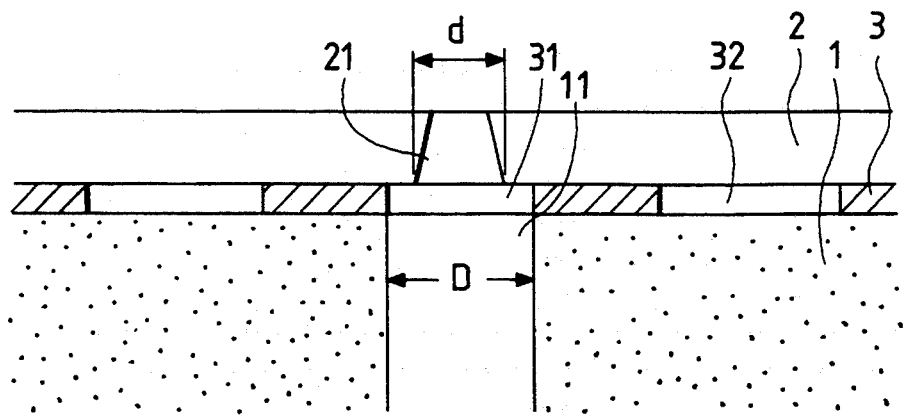
FIG. 7 is a view of a completely bonded state achieved according to the invention.

FIG. 2 is a plan view of a sheet-shaped adhesive member 3 employed in the first embodiment of a method of bonding together two members each having small holes according to the present invention, FIG. 3 is a side view of the sheet-shaped adhesive member 3 shown in FIG. 2, FIG. 4 is a side view of a positioning step employed in the first embodiment of the invention, FIG. 5 is a view of a step of provisionally bonding the adhesive member employed in the first embodiment of the invention, FIG. 6 is a view of a step of bonding a head base member, a nozzle plate and the adhesive member to one another according to the invention, FIG. 7 is a view of a completely bonded state achieved according to the invention.

The bonding steps will be described in detail as follows.

(1) First, there is prepared a composite member which consists of a material of a sheet-shaped adhesive member (Three Bond Co., No. 1604) laminated by a release sheet 30. As shown in FIG. 7, escape holes 31 are stamped out by a press at a position each corresponding to the respective nozzle hole 21 formed on the nozzle plate 2. In this stamping operation, as shown in FIG. 3, the diameter D of the escape hole 31 is set with respect to the diameter d of the nozzle hole 21 such that $D \geq d$, in consideration of a width for contraction occurring when heated and pressurized. A number of escape holes 31 are arranged in a line in the central portion of the adhesive member 3. Further, a number of deformation preventive holes 32 are stamped out in upper and lower lines with the central line of the escape holes 31 disposed therebetween. The diameter of each of the deformation preventive holes 32 is set to be equal to that of the escape hole 31. Then, positioning holes 33 are provided to positioning the adhesive member 3 when bonding and the outer configuration of the above-mentioned material of the adhesive member 3 are stamped out to thereby produce the sheet-shaped adhesive member 3.

(2) As shown in FIG. 4, the nozzle plate 2 with the contact surface of which facing upwardly is put on a positioning jig 50 having pins 51 and further the adhesive member 3 with the release sheet 30 disposed on the upper surface thereof is mounted on the nozzle plate 2 before the nozzle plate 2 and adhesive member 3 are properly positioned with respect to each other.

(3) Next, as shown in FIG. 5, the positioned nozzle plate 2 and adhesive member 3 mounted on the nozzle plate 2, together with the positioning jig 50, are set in a heat-pressure bonding machine 60 (Japan Abionics Co. Type TCW-125) and then the adhesive member 3 is provisionally pressure bonded onto the nozzle plate 2 under the condition of a heating temperature of 80° C. and a pressure of 3 kg/cm². After that, the release paper 30 is peeled off.

(4) Afterwards, as shown in FIG. 6, the head base member 1 is mounted on the adhesive member 3 and then the two members are positioned with respect to each other. Then, the head base member 1, adhesive member 3 and nozzle plate 2 are finally bonded to one another under the condition of a heating temperature of 120° C. and a pressure of 3 kg/cm².

Consequently, as shown in FIG. 7, the escape hole 31 restricted to a uniform thickness by a space forming member and is bonded by heating and pressurizing, will be contracted between the nozzle hole 21 of the nozzle plate 2 and the ink communication chamber 11 of the head base member 1 compared to itself before the adhesive member 31 is heated and pressurized for bonding. That is, the adhesive member 3 will be contracted down to the same and uniform size as the ink through hole 11 to thereby bond the nozzle plate 2 and head base member 1 to each other strongly without clogging the nozzle hole 21.

A sheet-shaped adhesive member and method of bonding together a head base member and a nozzle plate by the sheet-shaped adhesive member according to a second embodiment will be described hereinbelow with reference to accompanying FIGS. 9 to 14.

Figure 9:
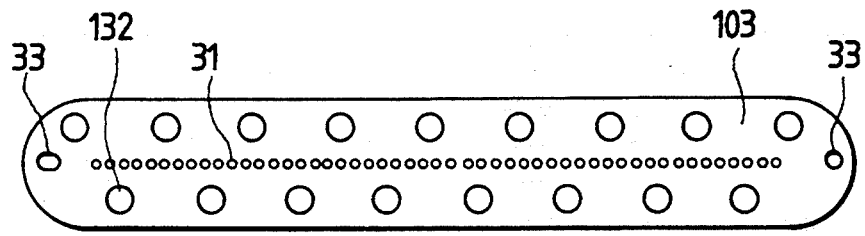
FIG. 9 is a plan view of an adhesive member used in a method of bonding together two members each having small holes embodying the second embodiment of the invention.
Figure 10:
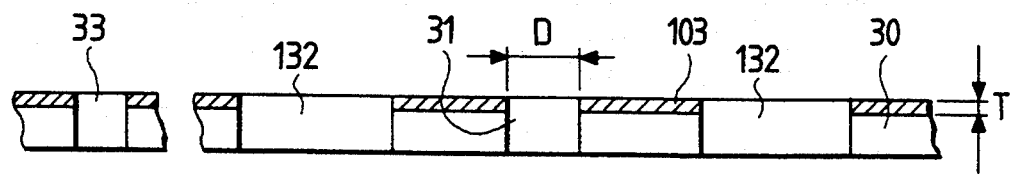
FIG. 10 is a side view of the adhesive shown in FIG. 9.
Figure 11:
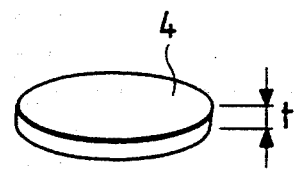
FIG. 11 is a perspective view of a space forming member used in the second embodiment of the invention.
Figure 12:
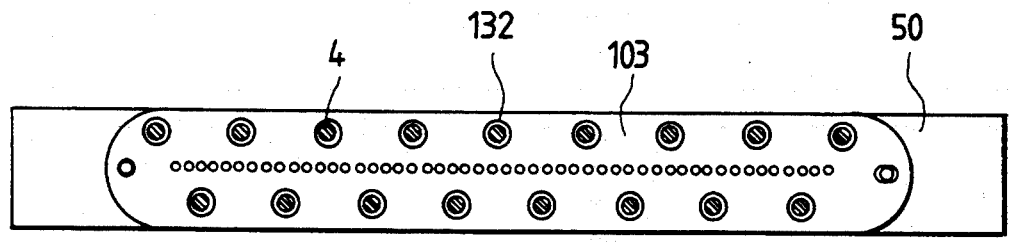
FIG. 12 is a view of a space forming member inserting step in the second embodiment of the invention.
Figure 13:
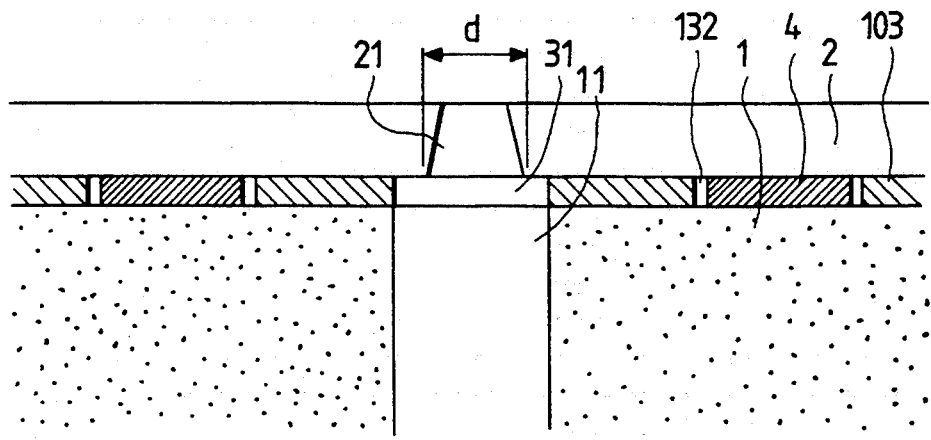
FIG. 13 is a view of a bonded state achieved by the second embodiment of the invention.
Figure 14:
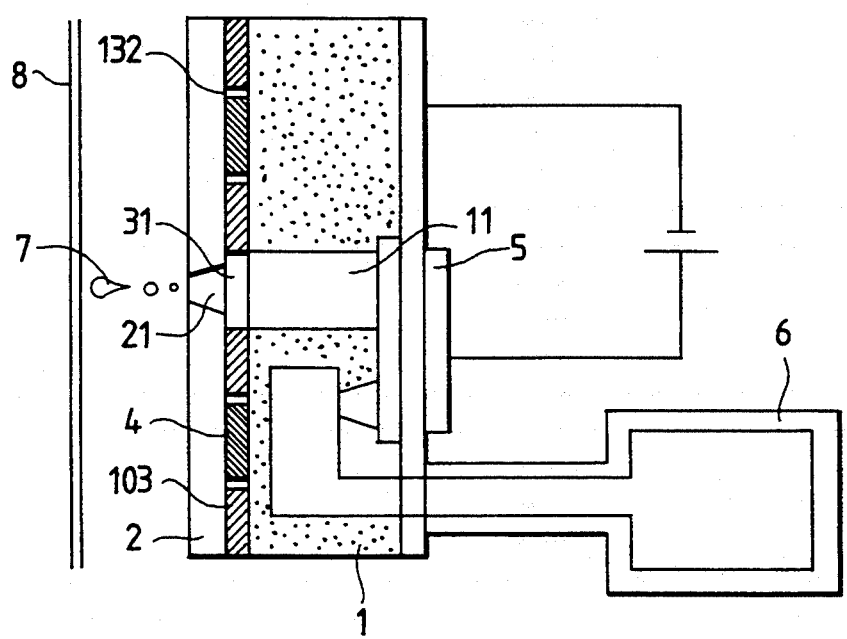
FIG. 14 is a view of a structure of an ink jet recording head to which the second embodiment of the invention is applied.

FIG. 9 is a plan view of an adhesive member used in a method of bonding together two members each having small holes embodying the second embodiment of the invention, FIG. 10 is a side view of the adhesive shown in FIG. 9, FIG. 11 is a perspective view of a space forming member employed in the second embodiment of the invention, FIG. 12 is a view of a space forming member inserting step in the second embodiment, FIG. 13 is a view of a bonded state achieved by the second embodiment, and FIG. 14 is a view of a structure of an ink jet recording head to which the second embodiment of the invention is applied.

In the drawings, like parts and components are designated by the same reference numerals as the first embodiment according to FIGS. 1 to 8. The method according to the second embodiment is similar to the first embodiment and, therefore, merely the different steps are described hereinbelow.

(1) The first step is substantially the same as the step (1) of the first embodiment described above. However, in the second embodiment, a plurality of insertion holes 132 for insertion of a space forming member 4 is stamped out on an sheet-shaped adhesive member 103 as shown in FIGS. 9 and 10.

(2) Next, a space forming member 4 shown in FIG. 11 having a thickness t is manufactured in such a manner that the thickness t of which is not greater than the thickness T of the adhesive member 3 as shown in FIG. 10, that is, $t \leq T$, in consideration of an expansion of a width due to a deformation of the adhesive member 103 when the adhesive member is bonded by heating and pressurizing. The space forming member 4 is formed of stainless steel so that it will never be deformed when the adhesive member is bonded by heating and pressurizing. The space forming member 4 is stamped out by a press-machining operation so as to have a circular shape which is easy to manufacture.

The bonding steps (3) and (4) of the first embodiment shown in FIGS. 4 and 5 are the same in the second embodiment after the step (2) thereof and the explanations of these steps are omitted.

(5) As shown in FIG. 12, the space forming member 4 is inserted into the insertion hole 132 formed on the adhesive member 103.

The next bonding step of this embodiment is also the same as the step (6) of the first embodiment shown in FIG. 6.

By means of the above-mentioned operations, as shown in FIG. 13, in the adhesive member 103, which is restricted to a uniform thickness by the space forming member 4 and is then bonded by heating and pressurizing, the escape hole 31 is contracted when compared with itself before it is heated and pressurized and thus it is of the same and uniform size as the ink communication hole 11, so that the adhesive member 103 is able to bond the head base member 1 and nozzle plate 2 to each other strongly without clogging the nozzle hole 21.

EXAMPLES

With respect to the adhesive member 3 and 103, the present inventors have experimented, besides the method using the sheet-shaped adhesive member according to the first and second embodiments, a method which uses a conventional liquid adhesive agent such as an epoxy contained adhesive member (Araldite Co. Type AW-106), a silicone contained adhesive member (Toray · Dow Coning · Silicone Co., Type SE 9157L) or the like. The result of the experimentation revealed that, when the conventional liquid adhesive member is used, it is difficult to apply the adhesive member to a clearance between the head base member 1 and the nozzle plate 2 in a uniform thickness. Also, the flow or penetration states of the adhesive member due to a capillary phenomenon occurring when pressure is applied are affected by the mixing ratio thereof, changes of environmental temperatures and the like and thus are caused to vary frequently according to such environmental conditions. As a result, it is difficult to secure stabilized communication between the nozzle hole 21 and ink communication chamber 11. Further, in the case of the sheet-shaped adhesive member according to the invention, the bonding processes were completed in several seconds when it is bonded by heating and pressurizing. On the other hand, the liquid adhesive member requires a long drying time ranging from 30 minutes to several hours.

For the escape holes 31 formed in the sheet-shaped adhesive member 3, besides the above-mentioned method according to the present embodiment in which each of the escape holes 31 is formed such that its diameter D is equal to or greater than the diameter d of the nozzle hole 21, the applicants have experimented another method in which no escape hole 31 is formed at all and, after bonded by heating and pressurizing, the adhesive members 3 and 103 are post-worked from externally by use of an excimer laser (Sumitomo Juki Co., Type INDEX 200) through the nozzle hole 21 formed on the nozzle plate 2 or through the communication chamber 11 in the head base member 1. However, our experimentation showed that this method is affected by dross or the like. That is, it is found difficult to post-work the whole nozzle uniformly. Further, if the diameter D of the escape hole 31 is smaller than the diameter d of the ink communication chamber 11 in the head base member 1, then the ink communication chamber 11 or nozzle hole 21 may be clogged when the adhesive member is bonded by heating and pressurizing, that is, when the adhesive member is contracted.

Figure 8:
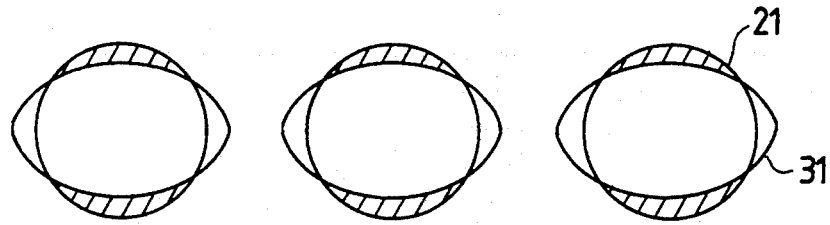
FIG. 8 is a view of the deformed shapes of an escape hole formed in the adhesive member when no deformation preventive hole is formed.

With regard to the deformation preventive holes 32 and 132, the present inventors have also tested another method in which no deformation preventive holes are formed. This test revealed that the escape hole 31 can be caused to vary into a non-circular shape having a directional characteristic as shown in FIG. 8 due to the contraction of the adhesive member 3 when it is heated and pressurized for bonding, so that the escape hole 31 clogs the nozzle hole 21 or nozzle communication chamber 11 as shown by oblique lines in FIG. 8. Referring to the diameter, positions, number and the like of the deformation preventive holes 32 and 132, the above-mentioned method is found favorable.

Further, referring to the space forming member 4, the present inventors have tested another method which does not use the space forming member 4. According to the result of the test, however, the amount Of deformation of the adhesive member 3, when it is heated and pressurized, is found to vary according to the heating temperatures and pressures, the conditions of the contact surfaces or the like, with the result that, after the adhesive member 3 is bonded by heating and pressurizing, the diameter of the escape hole is caused to vary, whereby the ink communication chamber 11 or nozzle hole 21 can be clogged. Further, the result of the test revealed that, if the thickness t of the space forming member 4 is greater than the thickness T of the adhesive member 3, then a width for deformation of the adhesive member exists no longer so that a practical bonding strength cannot be obtained.

FIGS. 15 to 18 illustrate a third embodiment of a sheet-shaped adhesive member according to the present invention, which is constructed so as to bond a nozzle plate employed in an ink jet type recording head, and a method of bonding the nozzle plate by use of this sheet-shaped adhesive member.

Figure 17:
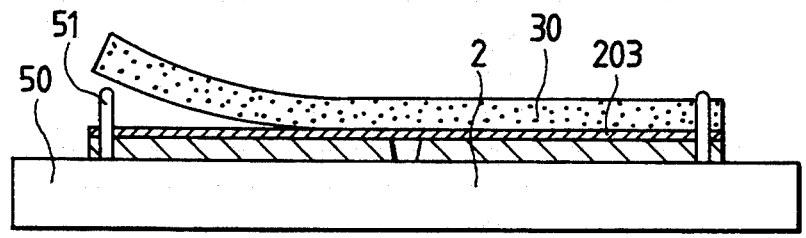
FIG. 17 is an explanatory view of the third embodiment, illustrating a step of bonding operation employed in the invention.
Figure 18:
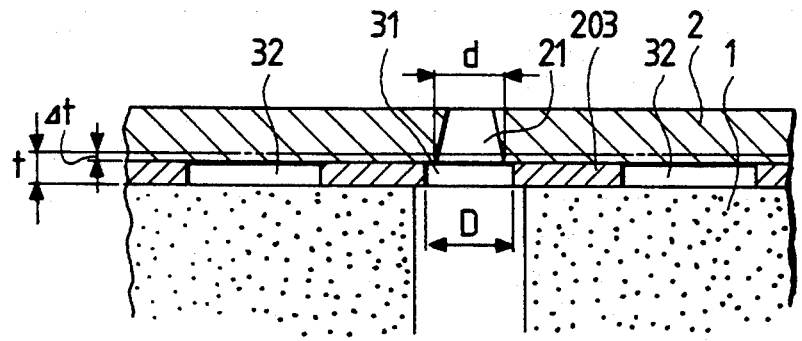
FIG. 18 is a sectional view of the third embodiment, illustrating a state in which the two members of which are bonded together.

In these figures, like parts and components are designated by the same reference numerals as the first and second embodiments shown in FIGS. 1 to 14. As shown in these figures, a sheet-shaped adhesive member 203 is used to bond a nozzle plate 2 to a head substrate 1. The sheet-shaped adhesive member 203 is of a hot melt type which penetrates in a semi-melt state into fine undulations on the surfaces of materials to be bonded and is hardened therein owing to an anchor effect to thereby bond the two members to be bonded to each other. The sheet-shaped adhesive member 203 is formed of a high molecular material consisting of a group comprising polyolefin, nylon, polyurethane, and a polyester. A release sheet 30 is adhered on the whole surface of the sheet-shaped adhesive member 203 for the purpose of reinforcement and, as shown in FIG. 17, the release sheet 30 will be peeled off after the sheet-shaped adhesive member 203 is provisionally mounted to the nozzle plate 2.

The fundamental structure of the sheet-shaped adhesive member 203 according to the third embodiment is the same as the member 3 according to the first embodiment shown in FIG. 2. Therefore, merely the different feature will be described.

In the third embodiment, the diameter D of the respective escape holes 31 is set about 1.8 times the diameter d of the nozzle hole 21 to correspond to an amount of compression $\Delta t$ of the sheet-shaped adhesive member 203. Further, the deformation preventive holes 32, which are formed on both sides of the escape holes 31, are formed in such a manner that the diameters thereof are substantially the same as the diameters D of the escape holes 31 and also that they are arranged in a zigzag line or in a column three deep at a distance $\delta$ which is substantially two times the diameter D of the escape hole 31.

Referring here in particular to the third embodiment of the sheet-shaped adhesive member 203, in a sheet-shaped adhesive member 203 having a thickness of 0.50 mm with a deformation width of 0.15 mm given, there are formed a number of escape holes 31 each having a diameter D of 0.38 mm with respect to the diameter of 0.15 to 0.18 mm of the nozzle hole 21 and, on both sides of the escape holes 31, there are formed the same number of deformation preventive holes 32 at a distance of 0.70 mm between the two preventive hole lines.

Figure 15:
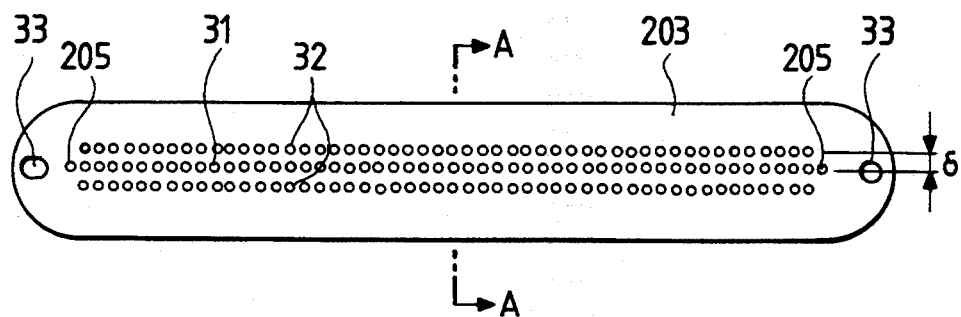
FIG. 15 illustrate a third embodiment of a sheet-shaped adhesive member according to the invention.
Figure 16:
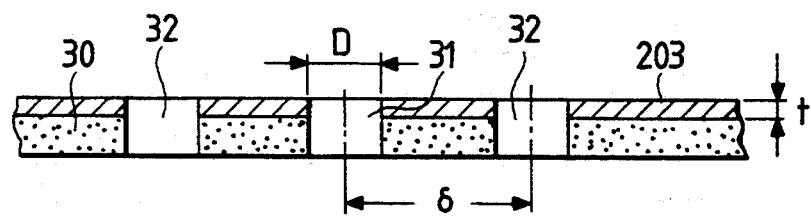
FIG. 16 is an enlarged sectional view taken on the line A—A shown in FIG. 15.

In FIG. 15, reference numeral 33 designates a pair of positioning holes which are respectively disposed at both the ends of the sheet-shaped adhesive member 203, and 205 represents a pair of dummy holes which are formed at both the ends of the escape hole 31 line in order to absorb the extension of the escape holes 31 in the longitudinal direction thereof to thereby restrict the deformation of the escape holes 31 in the longitudinal direction thereof.

Next, description will be given below of a process of bonding the substrate B and nozzle plate P to each other by use of the above-mentioned sheet-shaped adhesive member 1 with reference to FIG. 17.

At first, with two positioning pins 51 respectively planted on a jig 50 as the reference thereof, the nozzle plate 2 is positioned on the jig 50 with the adhesive surface thereof facing upward. Next, with the release sheet 30 mounted on the top surface thereof and also with the two positioning pins 51, corresponding in position to the positioning holes 33 the sheet-shaped adhesive member 203 is positioned and placed on the nozzle plate 2.

Since the bonding process of this embodiment is the same as that of the first and second embodiments described above and shown in FIGS. 5 and 6, the description is omitted.

As a result of the bonding process, the sheet-shaped adhesive member 203 is compressed and deformed in the thickness direction thereof and at the same time it is expanded in the surface direction thereof. With respect to the longitudinal extension of the sheet-shaped adhesive member 203, the respective escape holes 31 absorb the extensions thereof to one another and. Further, with respect to the extension of the adhesive member 203 in the width direction thereof, the deformation preventive holes 32, which are disposed on both sides of the escape holes 31, absorb the extensions in the width direction. Therefore, this can prevent the respective escape holes 31 from being deformed as much as possible and thus the inner edges of the escape holes 31 can be kept from coming into the nozzle holes 21. Furthermore, owing to the pair of dummy holes 205 formed at both the ends of the escape hole 31 line, the extension of the escape holes 31 in the longitudinal direction thereof is effectively suppressed to thereby restrict the deformation of the escape holes 31 in the longitudinal direction thereof. Accordingly, the head base member 1 and nozzle plate 2 can be bonded together with high accuracy.

Figure 19:
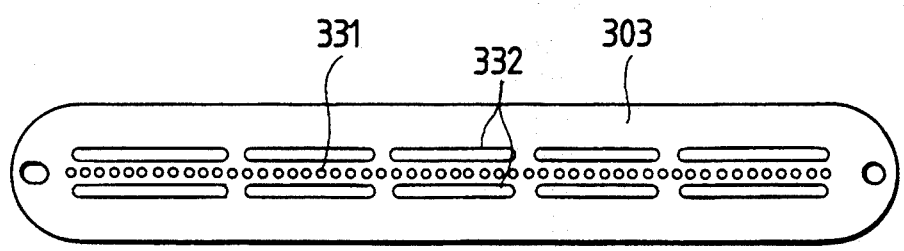
FIG. 19 is a plan view of a fourth embodiment of a sheet-shaped adhesive member according to the invention.

FIG. 19 shows a sheet-shaped adhesive member according to the fourth embodiment of the invention.

In the fourth embodiment, on both sides of a number of escape holes 331 arranged in a line, there are formed a plurality of deformation preventive slits 332 each having a width corresponding to the diameter of the escape hole 331. Owing to this structure, the extension of a sheet-shaped adhesive member 303 caused when it is compressed and deformed is absorbed by the deformation of the deformation preventive slits 332 to thereby restrict the deformation of the escape holes 331 as much as possible.

Figure 20:
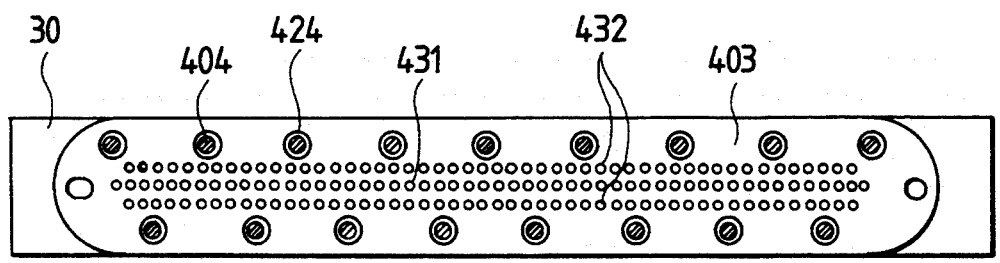
FIG. 20 shows a fifth embodiment of sheet-shaped adhesive member according to the invention.

FIG. 20 shows a fifth embodiment of sheet-shaped adhesive member according to the invention, in which deformation restricting spacers 404 are used for further restricting the deformation of escape holes 431.

In the present sheet-shaped adhesive member 403, on both sides of the escape holes 431 formed in a line, there are formed a number of deformation preventive holes 432 and further, on both sides of the deformation preventive holes 432, there are formed a plurality of spacer insertion holes 424 into which there is inserted deformation restricting spacers 404 each corresponding to the thickness of the sheet-shaped adhesive member 403 obtained when an allowable compression amount $\Delta t$ is subtracted.

Figure 21:
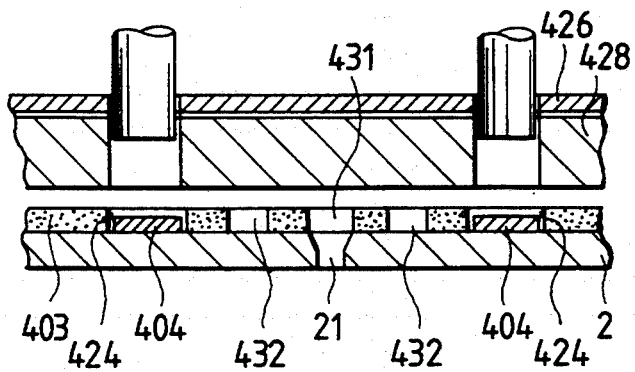
FIG. 21 is an explanatory view to show a method of fitting a deformation restricting spacer into the above adhesive member.

In the fifth embodiment, as shown in FIG. 21, the sheet-shaped adhesive member 403 is provisionally mounted onto the nozzle plate 2 and is positioned just below a press machine 428 and, after that, the respective deformation restricting spacers 404, which are respectively stamped out from a steel plate 426, are allowed to fall down into the spacer insertion holes 424.

Owing to this structure, the compression amount of the sheet-shaped adhesive member 403 can be restricted within an allowable range and at the same time the deformation of the escape holes 431 can be prevented by the escape holes 431 and deformation preventive holes 432 formed on both sides thereof, so that the nozzle plate 2 can be fitted to the head base member 1 without producing any clogging.

In this embodiment, if the deformation of the sheet-shaped adhesive member 403 is restricted by the deformation restricting spacers 404 to a sufficient extent, then the deformation of the escape holes 431 can be restricted to such a degree that the inner edges of the escape holes cannot come into the nozzle holes 21, even when the deformation preventive holes 432 are not specially formed on both sides of the escape holes 431.

Figure 22A:
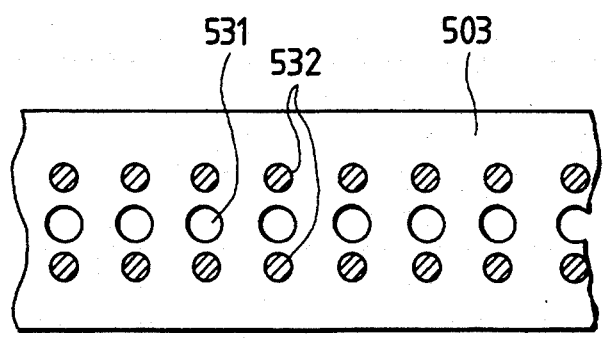
FIG. 22A is a plan view of main portions of a sixth embodiment of a sheet-shaped adhesive member according to the present invention.
Figure 22B:
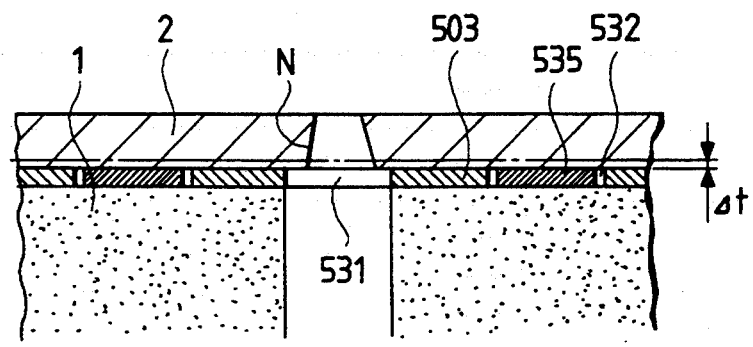
FIG. 22B is a sectional view of the sixth embodiment, illustrating a state in which the two members of which are bonded together.

FIGS. 22A and 22B show a sixth embodiment of a sheet-shaped adhesive member in which deformation preventive holes are used for storing deformation restricting spacers.

In the sixth embodiment, there is used as a deformation preventive material a paste material which includes fine grains composed of a high molecular material such as an epoxy resin, urethane, polyimide or the like dispersed in a volatile solution and also which, when heated and compressed, is reduced in volume and hardened. Further, deformation preventive paste material 535 is previously applied into each of deformation preventive holes 532 respectively formed on both sides of escape holes 531 before the sheet-shaped adhesive member is actually used.

In the sixth embodiment, if the sheet-shaped adhesive member 503 interposed between the nozzle plate 2 and head base member 1 is heated and pressurized, then the deformation preventive paste material 535 is contracted in thickness by an amount corresponding to the compression amount width $\Delta t$ of the sheet-shaped adhesive member 503 and, at the same time, the paste material 535 is contracted in the outside diameter thereof and is hardened. As a result, the deformation of the sheet-shaped adhesive member 503 in the thickness direction thereof is restricted by the deformation preventive paste material 535 and, at the same time, the extension of the sheet-shaped adhesive member 503 in the surface direction thereof is absorbed by a clearance formed between the paste material 535 and deformation preventive hole 532, so that the inward deformation of the escape holes 532 can be further suppressed.

As described above, according to the present invention, when bonding two members each having small holes to each other, a sheet shaped adhesive member including escape holes each corresponding to the small holes of one member and deformation preventive holes for preventing the escape holes from being deformed is provisionally bonded by pressurizing onto one member and then the other member is bonded by heating and pressurizing onto the contact surface of the one member, so that the two members can be bonded together strongly and efficiently without causing any hole clogging.

Further, when bonding together two members each having small holes, there is provisionally bonded by pressurizing onto one of the two members a sheet-shaped adhesive member which includes therein escape holes respectively corresponding to small holes of the one member, space forming members each having a proper thickness are inserted into the sheet-shaped adhesive member, and the other member is then bonded to the contact surface of the one member by heating and pressurizing the adhesive member. Owing to this, the two members each having small holes can be bonded together strongly and highly efficiently without causing any hole clogging.

In the foregoing description, the present invention has been described by way of an example in which the head base member 1 and nozzle plate 2 respectively used in a ink jet printer are bonded to each other. However, the invention is not limited thereto or thereby, but it can also apply as means for bonding together other kinds of two members each having small holes which may be clogged with an adhesive member. Further, the invention may also be applied to an adhesive member which bonds together two members such as a water sprinkler or the like, which respectively have small holes.

What is claimed is:

1. An ink jet head, comprising at least a sheet-shaped adhesive member having a longitudinal axis, a nozzle member, and a chamber member, the sheet-shaped adhesive member being interposed between the nozzle member and the chamber member for bonding the nozzle member and the chamber member into an integrated member, the nozzle member having nozzle holes, the chamber member having ink communication holes, and the sheet-shaped adhesive member having ink escape holes and deformation preventive holes formed adjacent to said ink escape holes, each of the ink escape holes being aligned with one of the nozzle holes of the nozzle member and with one of the ink communication holes of the chamber member, such that in the integrated member, ink may escape from the chamber member to the nozzle member via the ink escape holes.

2. The ink jet head of claim 1, wherein said deformation preventive holes are disposed on both sides of said ink escape holes.

3. The ink jet head of claim 1, wherein said ink escape holes are arranged in a line parallel to the longitudinal axis of said adhesive member and wherein said deformation preventive holes are slit-shaped holes extending along two sides of the line of said ink escape holes.

4. The ink jet head of claim 1, further comprising a deformation restricting piece embedded in said sheet-shaped adhesive member for restricting an amount of contraction of said sheet-shaped adhesive member in the thickness direction thereof.

5. The ink jet head of claim 1, further comprising a deformation restricting paste inserted into said deformation preventive holes.

* * * * *